United States Patent [19]
Hofelt, Jr. et al.

[11] 3,775,854
[45] Dec. 4, 1973

[54] CHECKING STATION FOR TIRES OF DIFFERENT SIZES

[75] Inventors: Clarence Hofelt, Jr.; Francis C. Rongone, both of Cuyahoga Falls, Ohio

[73] Assignee: The General Tire & Rubber Company, Akron, Ohio

[22] Filed: Dec. 30, 1971

[21] Appl. No.: 214,091

[52] U.S. Cl. .............................. 33/174 R, 33/143 D
[51] Int. Cl. .............................................. G01b 5/10
[58] Field of Search ..................... 33/143 D, 174 R, 33/143 L, 147 L; 209/80, 82, 88 R

[56] References Cited
UNITED STATES PATENTS

| | | | |
|---|---|---|---|
| 3,195,724 | 7/1965 | Whitacre | 209/88 R |
| 3,018,889 | 1/1962 | Fouse | 209/88 R |
| 2,400,507 | 5/1946 | Henszey et al. | 209/80 X |
| 3,455,082 | 7/1969 | Feigel | 209/82 X |

*Primary Examiner*—Louis R. Prince
*Assistant Examiner*—Charles E. Phillips
*Attorney*—Frank C. Rote, Jr. et al.

[57] ABSTRACT

A method and apparatus for measuring automatically the diameter and axial width of a pneumatic tire while the tire is traveling continuously along a conveyor for example. The measurments are represented by electrical signals, the respective levels of which may be used as parameters to check the size and load bearing classification of the tire and to program subsequent processing thereof. Mechanical sensors are used to engage and measure the respective dimensions and to generate the respective signals.

12 Claims, 7 Drawing Figures

INVENTORS
CLARENCE HOFELT, JR.
FRANCIS C. RONGONE
BY
ATTORNEY

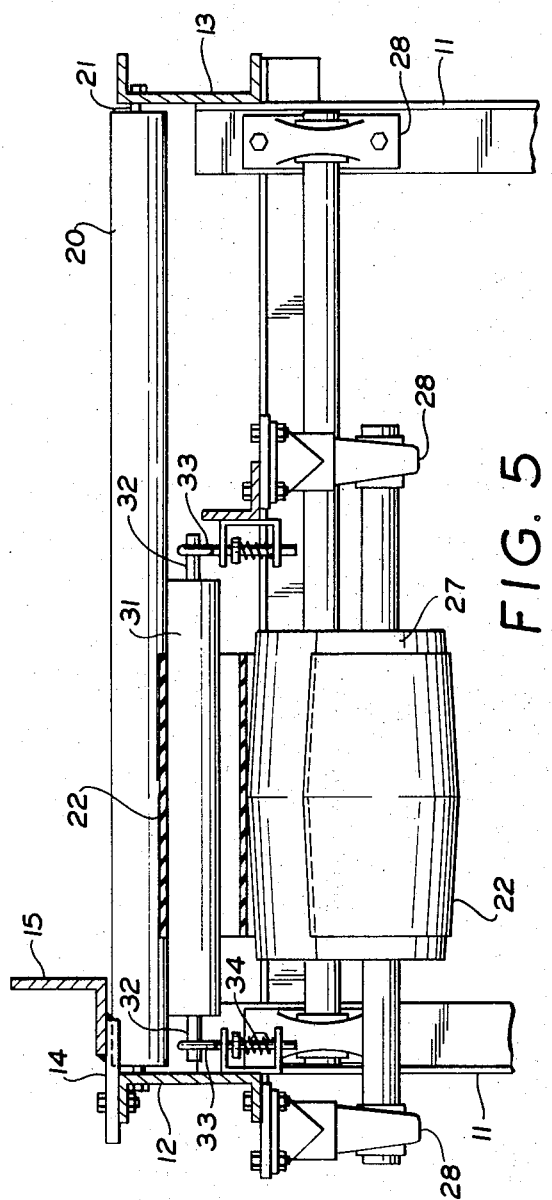

CHECKING STATION FOR TIRES OF DIFFERENT SIZES

BACKGROUND OF THE INVENTION

This invention relates to the production of pneumatic tires and especially to the processing of tires following their removal from the vulcanizing mold and normal post-cure operations. More particularly the invention relates to the automatic measuring and checking of tires that are of uncertain size and load bearing classification. The measurements provide the necessary parameters to determine, such as with a computerized control system, the physical size and load bearing classification of the tire.

In the production of pneumatic tires, certain processing is often accomplished following cure and normal post-cure operations. During this processing it it often necessary to sort tires of different size (i.e. different bead or rim diameter or different overall axial widths) or to distinguish from one another, tires of the same norminal size but of different types of construction (such as between tires having bias cords and radial cords).

Conventionally, tires of the same bead or rim diameter (e.g. 13 inch, 14 inch or 15 inch) are manufactured in several different overall axial widths to provide different load bearing capacities. Also tires of the same bead or rim diameter and approximately the same width may have different constructions as indicated above. For example, they may be bias belted, may have radial cord construction in the carcass or bias cord construction, etc.

Each classification, however, has a unique combination of tread diameter and overall axial width that may be used to accurately classify it as to size and construction. Many operations performed on tires after their cure and post-cure processing are dependent on the particular classification of the tire. Some examples are tire truing or tire uniformity correction, sorting of tires for shipment, and passage through final finish lines for trimming, spraying etc. In many of these operations the tire is transported on a continuous conveyor such as a bed of driven rolls, and is carried on its side with the tire axis vertical. Also the tires may be mounted on a rim, in either an inflated or deflated condition, or they may be unmounted.

In the past, the classification and checking of manufactured tires have been accomplished either visually or by manual inspection and measurement, all of which is burdensome and time consuming and also subject to error.

The method and apparatus of the present invention, however, resolve the difficulties indicated above and afford other features and advantages heretofore not obtainable.

SUMMARY OF THE INVENTION

A general object of the invention is to automatically determine the size and load bearing classification of a pneumatic tire.

Another object of the invention is to automatically check the physical classification of tires while they move continuously on a conveyor.

A further object is to automatically measure the diameter and axial width of a pneumatic tire moving on a conveyor past a checking station.

Still another object is to generate automatically, electrical signals, the maximum levels of which represent the diameter and axial width of a pneumatic tire being transported past the sensors that generate the respective signals.

These and other objects are accomplished by the method and apparatus of the present invention wherein the tire is being continuously transported through a checking zone wherein there is provided a means such as a bed of conveyor rolls engageable with one side of the tire in a plane perpendicular to the axis of the tire, and another guide means such as a guide bar at one side of the conveyor that engages the tread of the tire along a plane parallel to the axis of the tire and parallel to the direction of translation.

As the tire is guided in the above manner it is engaged by an axial width sensor movable in a fixed path toward and away from the bed of rolls and biased toward the bed of rolls such as by its own weight. The width sensor is engaged by the tire and displaced from the bed of rolls in such a way that the spacing between the sensor and the plane defined by the bed of rolls is the axial width of the tire. During its displacement the width sensor generates a signal, the maximum value of which during the passage of a tire pass the checking station represents the axial width of the tire.

The diameter of the tire is measured by a diameter sensor movable in a fixed path toward and away from the guide bar and biased toward the guide bar such as by a helical spring. The diameter sensor is adapted to be engaged by the tire tread and displaced away from it during the passage of a tire in such a way that the spacing between the diameter sensor and the edge guide at the time the sensor is diametrically opposite to the point of engagement of the tread with the guide bar, represents the tread diameter of the tire. During its displacement, the diameter sensor generates a signal, the maximum level of which represents the diameter of the tire. The generation of the respective signals is preferably accomplished by means of a linear variable distance transformer (hereinafter LVDT) which responds to the depression of a plunger to provide a signal level that may be used for any number of control type functions such as to supply a signal to a computer for example where the voltage level representing the respective measurements is converted by an analog-to-digital converter, to pulses suitable for input to a computer that computes from the measurements and from data already stored, the correct classification of the tire that is checked. The calculated classification can then be used to adjust additional equipment such as a tire uniformity correction machine programmed to operate on that particular classification of tire.

BRIEF DESCRIPTION OF THE DRAWINGS

FIG. 5 is a fragmentary sectional view on an enlarged scale taken on the line 5—5 of FIG. 2;

FIG. 6 is a fragmentary sectional view on a still larger scale taken on the line 6—6 of FIG. 2.

DESCRIPTION OF THE PREFERRED EMBODIMENT

Figure 1:
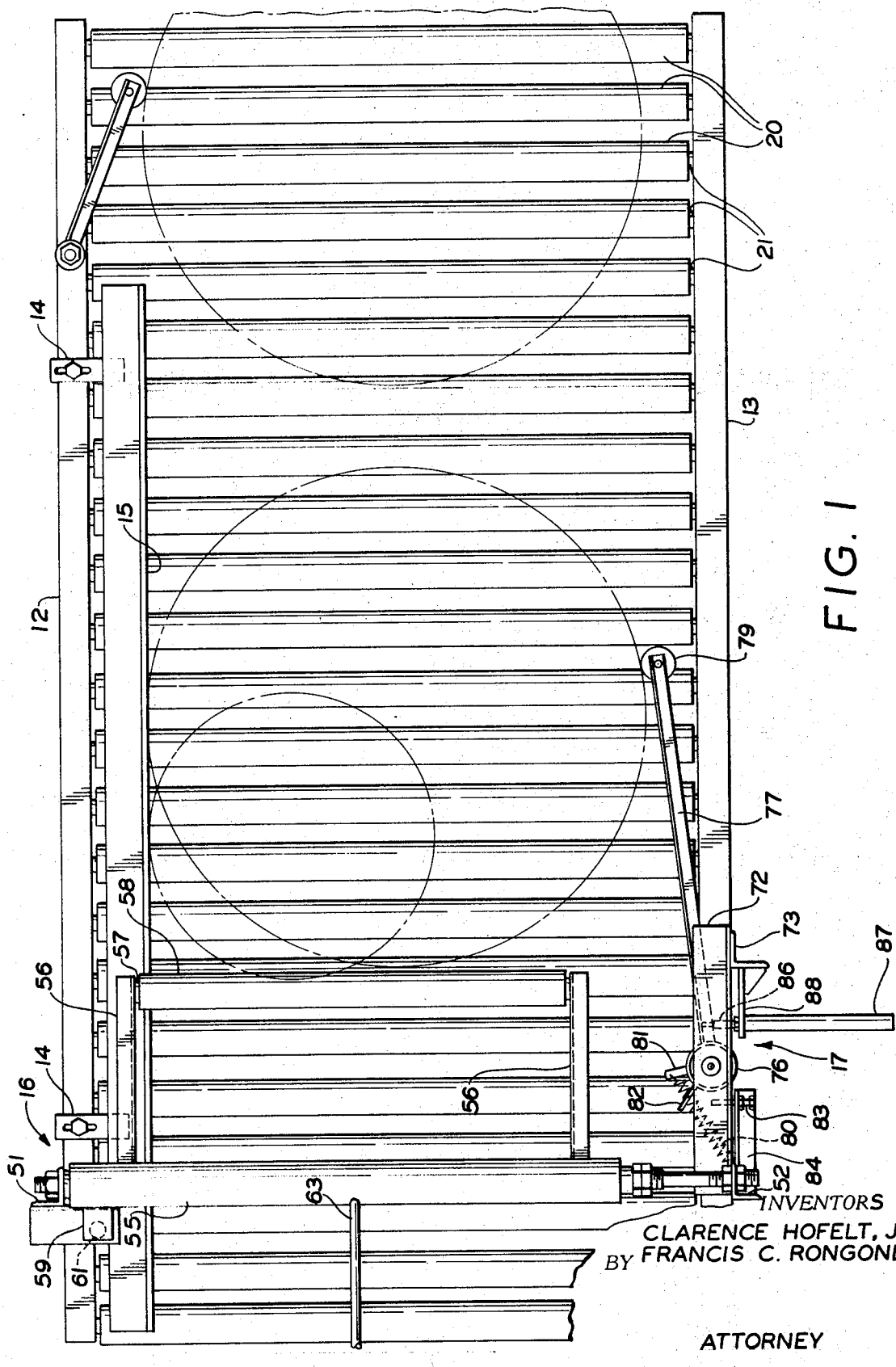
FIG. 1 is a plan view of a roll type conveyor having associated therewith apparatus for automatically measuring the diameter and axial width of a tire being transported thereby.
Figure 2:
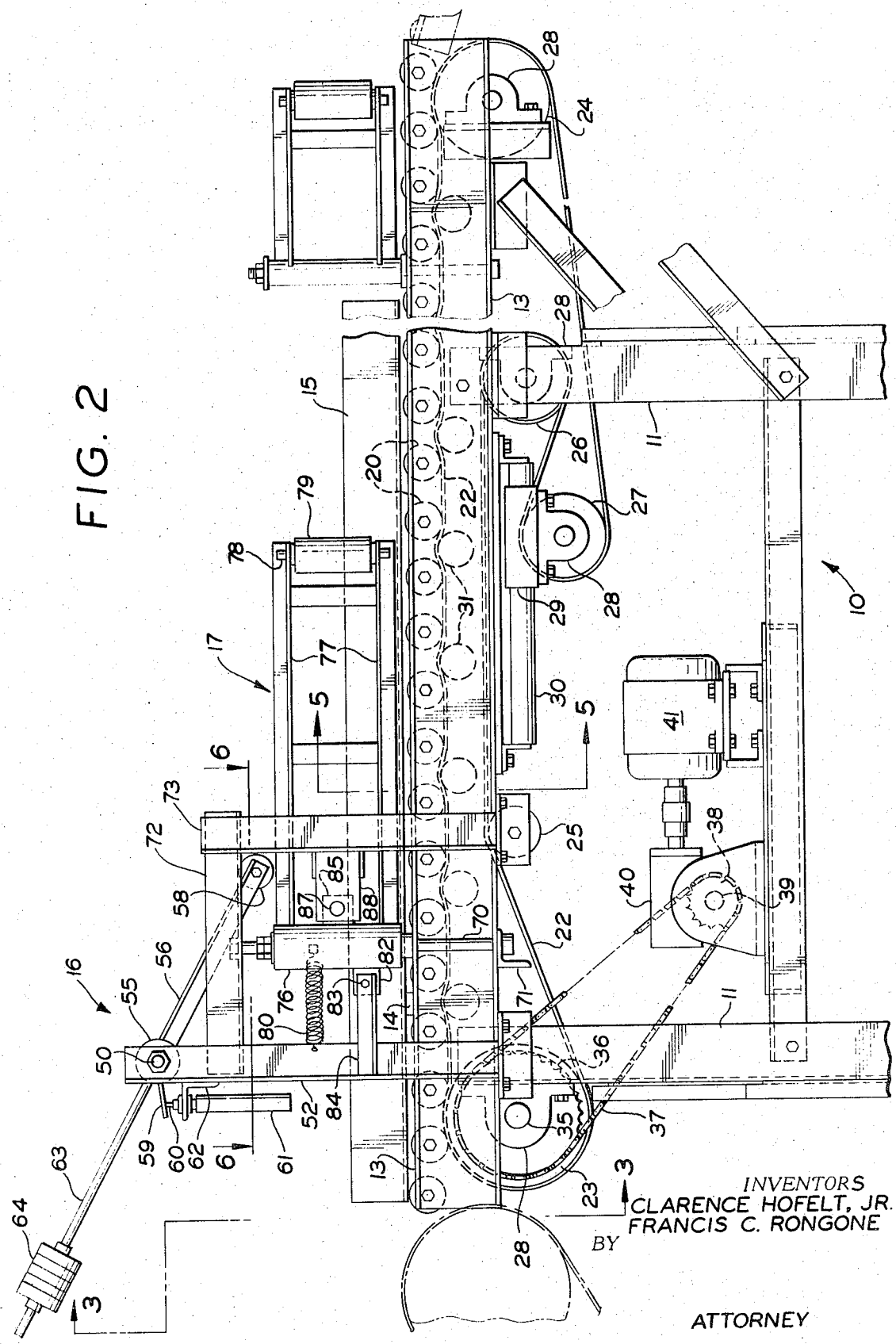
FIG. 2 is a side elevation of the roll conveyor and associated apparatus of FIG. 1 with a portion removed for the purpose of more complete illustration.

Referring more particularly to the drawings and initially to FIGS. 1 and 2 there is shown a conventional roll type conveyor assembly for transporting tires resting on their sides with their axis in a generally vertical position, in association with a tire measuring and checking system embodying the invention.

The conveyor and checking system are supported by a frame 10 constructed for the most part of steel angle members including vertical legs 11 suitably braced by other members suitably welded or bolted in place. The frame also includes a pair of parallel, horizontal "channel" beams 12 and 13 that support the conveyor rolls as will be described in more detail below. The beam 12 has two spaced brackets 14 adjustably bolted to the top flange thereof (FIG. 1). The brackets 14 are welded on an angle bar one flange of which serves as an edge guide 15 for a tire traveling across the conveyor bed. The edge guide 15 engages the tread of the tire and is aligned with the direction of travel of the tire across the bed.

The frame 10 also supports an axial width sensing assembly 16 and a diameter assembly 17, both of which are described in detail below.

ROLL CONVEYOR ASSEMBLY

The roll conveyor construction is best illustrated in FIGS. 1, 2, 5 and 7 and comprises a plurality of uniformly spaced horizontal rollers 20 mounted on fixed axels 21, bolted at their opposite ends to the beams 12 and 13. The axels 21 extend transversely of the beams and are perpendicular thereto so that the rolls 20 define a conveying surface that supports and propels a tire from left to right across the roll bed as viewed in FIGS. 1 and 2. The rolls 20 are engaged and driven by a belt 22 having an upper span that extends below the rolls and engages their surfaces to turn them all in the same direction at the same speed. The belt 22 extends between a head pulley 23 and tail pulley 24 and the lower span passes across an idler pulley 25 and a pair of cooperating tensioning pulleys 26 and 27, the latter of which is an adjustable take up pulley to provide proper tensioning of the belt 22. The head pulley 23 and tail pulley 24 are so located that they press the ends of the upper span of the belt 22 upwardly into engagement with two adjacent rolls 20 at opposite ends of the conveyor bed. The axels of the pulleys 23, 24, 26 and 27 are journalled in bearing blocks 28 bolted to the frame at suitable locations. The bearing blocks 28 for the take up pulley 27 are each bolted to one of two sleeve members 29 each of which is adjustably received on one of two rods 30. The rods 30 are bolted to the bottom flange of one of the beams 12 and 13. (FIGS. 2 and 5)

The upper span of the belt 22 is engaged by pressure rollers 31 each of which urges the belt upwardly into driving engagement with two adjacent rolls 20 located immediately above. This arrangement is best illustrated in FIGS. 3, 4, 5 and 7. The pressure rollers 31 have fixed axels 32 with their ends anchored in upright axel carriers 33 that are urged upwardly by helical springs 34 to force the pressure rollers 31 and the belt 22 upwardly against the respective pair of conveyor rolls 20.

Figure 3:
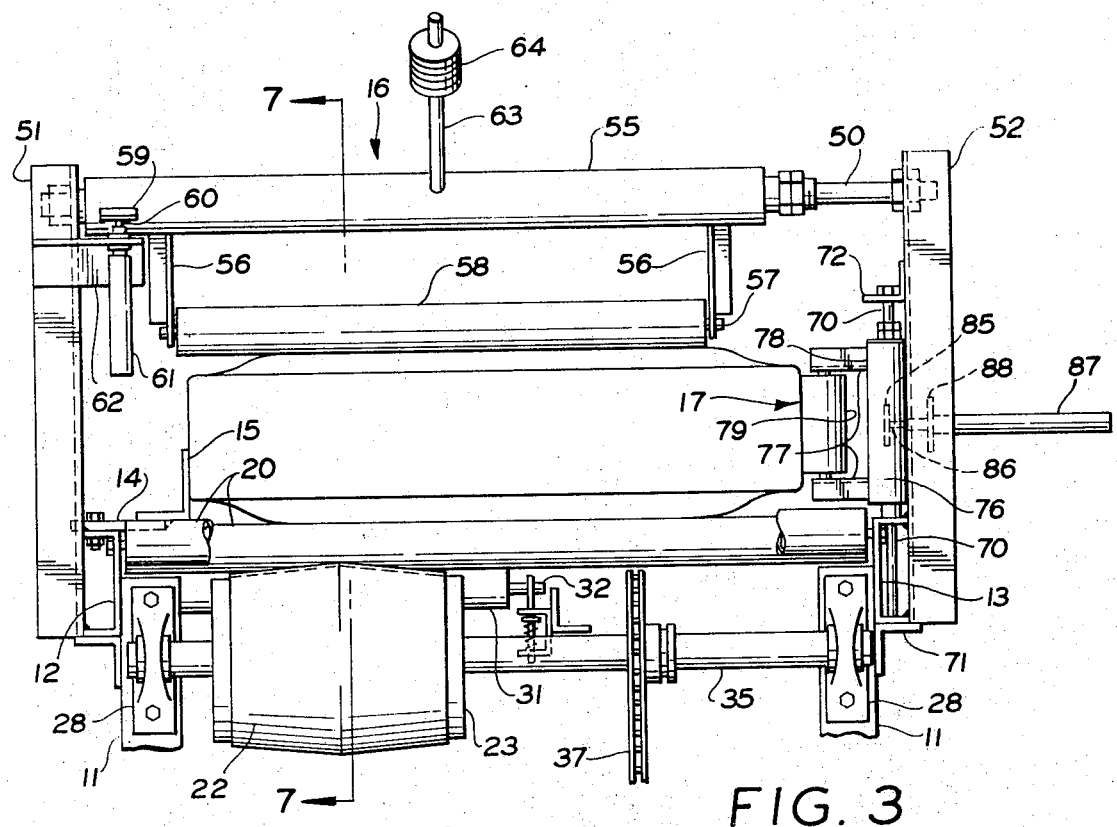
FIG. 3 is a fragmentary end elevation taken from the line 3—3 of FIG. 2, illustrating the measuring of the tire diameter and axial width of a tire of relatively large size.
Figure 4:
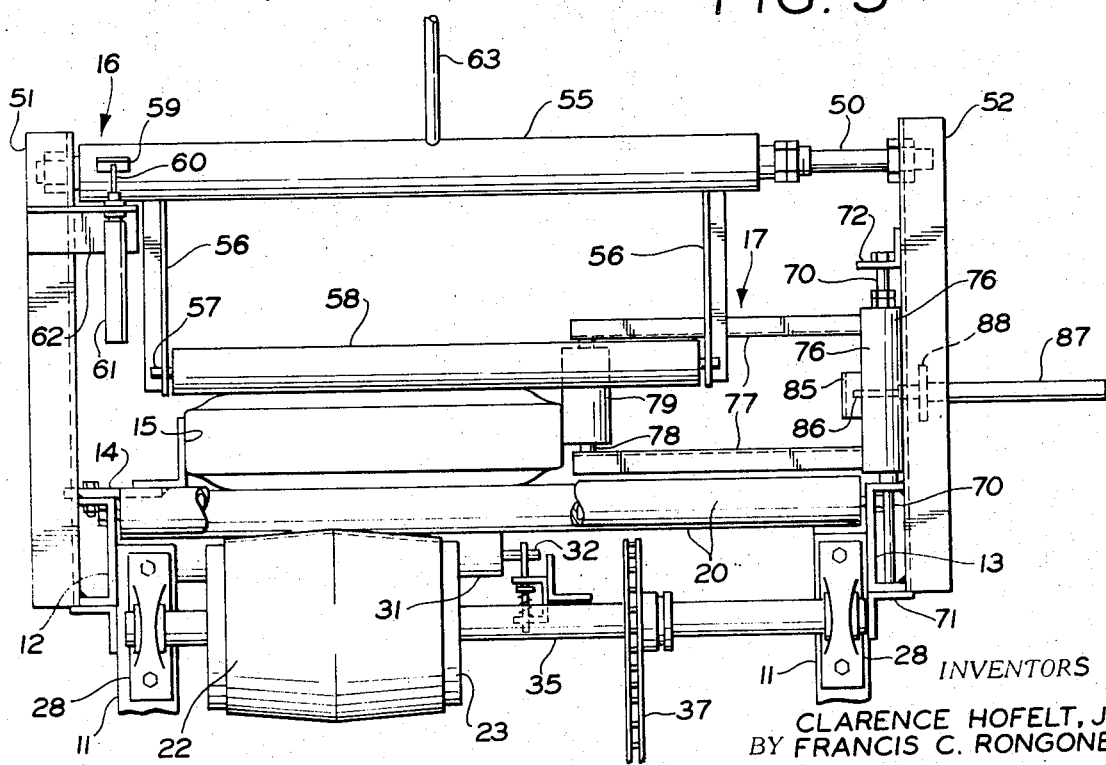
FIG. 4 is an end elevation similar to FIG. 3 showing the measuring being accomplished on a tire of relatively small size.
Figure 7:
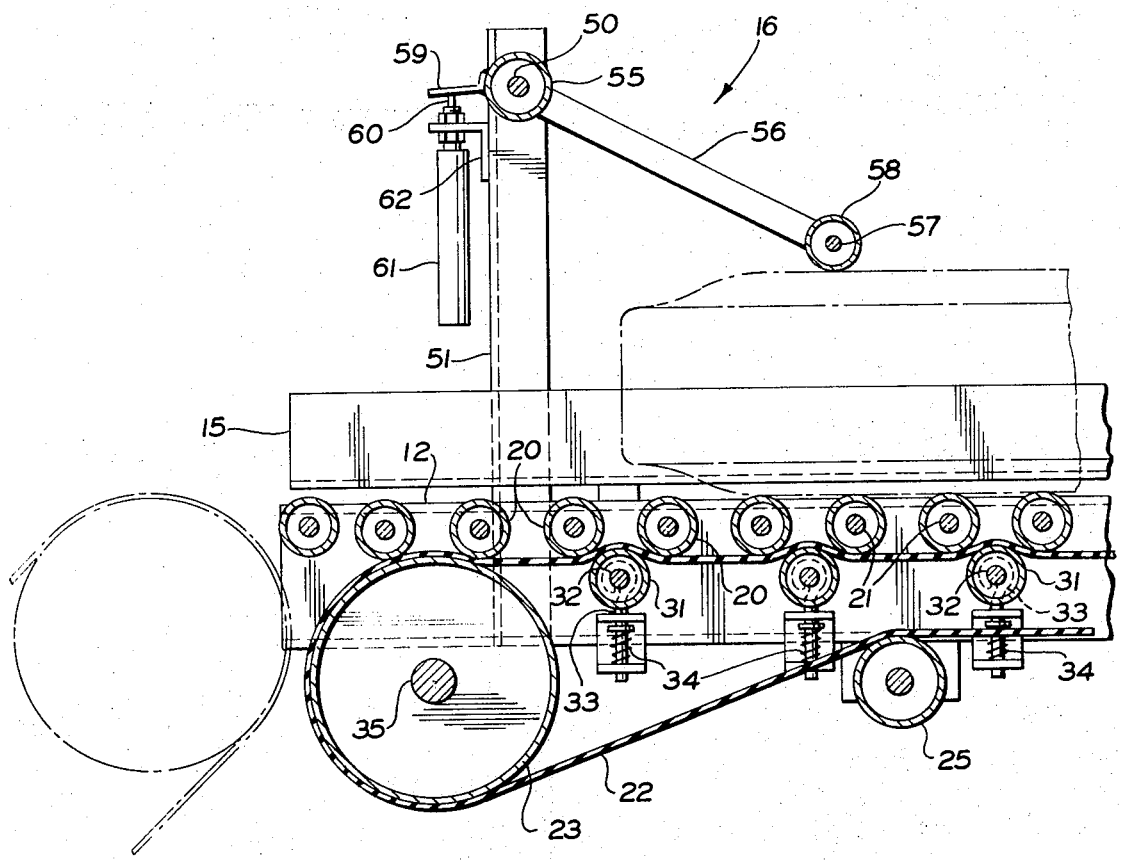
FIG. 7 is a fragmentary sectional view on an enlarged scale taken on the line 7—7 of FIG. 3.

The head pulley 23 is mounted on a live axel 35 that also has a sprocket 36 keyed thereto as best illustrated in FIGS. 2, 3 and 4. The sprocket 36 is driven by a chain 37 that in turn is driven by a drive sprocket 38 mounted on the output shaft 39 of a gear reducer unit 40. The unit 40 is driven by an electric motor 41 bolted to the frame 10 and adapted to provide the motive power for the conveyor rolls 20.

TIRE AXIAL WIDTH MEASURING ASSEMBLY

The tire axial width measuring assembly 16 is best illustrated in FIGS. 1, 2, 3, 4 and 7 and comprises a horizontal fixed axel rod 50 bolted at its opposite ends to a pair of upright posts 51 and 52 that are welded to the beams 12 and 13 respectively. An elongated cylindrical pivot tube 55 is journalled on the rod such as by tapered roller bearing units at its opposite ends. A pair of spaced parallel carrier arms 56 are welded to the pivot tube 55 adjacent its opposite ends. The outer ends of the arms 56 have bolted thereto a fixed axel rod 57 that extends therebetween and which has journalled thereon a sensing roller 58 adapted to engage the upwardly facing side wall of a tire translating across the bed of rolls. Thus, the spacing between the roller 58 and the bed of conveyor rolls 20 is equivalent to the axial width of the tire. It will be seen that the sensing roller 58 is of sufficient length to engage the side walls of tires of widely varying diameter.

Also welded to the pivot tube 55 is an actuator arm 59 which engages the plunger 60 of a linear variable displacement transformer (LVDT) 61 mounted on a bracket 62 that is welded to the post 51. Welded at approximately the center of the pivot tube 55 is a balance arm 63 (FIG. 2) having adjustable weights 64 secured thereon to provide some counterbalancing of the sensing roller 58 and pivot arms 56.

Thus, the upward displacement of the sensing roller 58 by a tire as it passes along the conveyor causes the downward pivotal movement of the actuator arm 59 and depression of the plunger 60 into the LVDT 61. This generates a voltage signal the maximum level of which during the movement of a tire on the conveyor past the sensing roller 58 represents the axial width of the tire. Since the level of the voltage signal from the LVDT 61 has a linear relation to the movement of the plunger 60 the level of the signal will vary so that the axial width of the tire can be measured linearaly using the level of the voltage signal.

FIGS. 3 and 4 show the relative positions of the sensing roller 58 in measuring tires of different sizes. FIG. 3 indicates the upward displacement of the roller 58 by a tire of relatively large diameter and axial width, while FIG. 4 illustrates a considerably smaller upward displacement when measuring a tire of much smaller diameter and axial width.

TIRE DIAMETER MEASURING ASSEMBLY

The tire diameter measuring assembly 17 is best illustrated in FIGS. 1, 2, 3, 4 and 6 and comprises a vertical axel rod 70 bolted at its lower end to a bracket 71 welded to the beam 13, and at its other end to a horizontal angle bar 72 supported at one end by the post 52 and at the other end by another upright post 73 welded at its bottom end to the beam 13. The rod 70 has journalled thereon such as by tapered roller bearing units, a vertical pivot tube 76.

The pivot tube 76 has welded thereto in a manner similar to the corresponding structure of the tire axel width measuring assembly 16, a pair of spaced parallel horizontal pivot arms 77 that carry at their outer ends a fixed vertical axel rod 78 bolted thereto and extending therebetween. The axel rod 78 has journalled thereon a tire diameter sensing roller 79 adapted to engage the tread of a tire being trasported along the conveyor bed and to be displaced outwardly by the tire in a direction away from the edge guide 15.

Thus, the maximum displacement of the roller during the passage of a tire along the roll conveyor is equal to the tread diameter of the tire assuming that the tread is in continuous engagement with the edge guide 15. This continuous engagement is assured by means of a helical tension spring 80 connected between the post 52 and a tensioning arm 81 that is welded to the pivot tube 76 (FIG. 6). The spring 80 urges the arms 77 and sensing roller 79 inward toward the edge guide and thus tends to force a tire on the roll conveyor into continuous engagement with the edge guide 15.

The movement of the arms 77 and sensing roller 79 toward the edge guide 15 is limited by a stop arm 82 welded to the pivot tube 76 and engageable with an adjusting bolt 83 fastened to a bracket 84 welded to the post 52.

The pivot tube 76 also has an actuator arm 85 welded thereto and adapted to engage the plunger 86 of another linear variable distance transformer (LVDT) 87 mounted on a bracket 88. Thus as a tire is transported along the bed of rolls the pivot arms 77 will be moved outwardly in an arc as the sensing roller 79 is displaced by the tire tread so as to depress the plunger 86. The maximum depression of the plunger 86 will occur when the sensing roller 79 is diametrically opposite the location on the tire tread that is in engagement with the edge guide 15. At this point the displacement of the sensing roller 79 will be equivalent to the diameter of the tire and the voltage level generated by the LVDT 86 represents the diameter of the tire travelling across the conveyor bed.

OPERATION

With the mechanism thus described it will be apparent that tires being loaded onto the left hand end of the conveyor bed as viewed in FIG. 2 will proceed along the bed of rolls until a leading edge of the tire engages the axial width sensing roller 58. Further movement of the tire will displace the roller 58 upwardly against the force urging it downward and the roller will turn freely as a tire travels below it. The ultimate displacement reached by the roller 58 is reflected in a voltage signal from the LVDT 61.

As the tire proceeds further its tread will be engaged by the diameter sensing roller 79 which will roll freely across the tread as the tire moves along until the roller reaches a maximum displacement away from the edge guide 15. At this point the level of the voltage signal from the LVDT 87 will represent the diameter of the tire. The two voltage signals are then transmitted according to one aspect of the invention, to an analog-to-digital converter which converts the signals to electrical pulses suitable for input to a digital computer that uses the pulse signal to calculate the axial width and the diameter of the measured tire. These parameters are then compared with data stored in the computer in such a way that the respective values will be unique for one classification of tire and the computer will read out data reflecting the particular physical size and load bearing classification. This data may be used for example to program the tire uniformity correction system into which the respective tire will be moved following its exit at the right hand end of the conveyor as viewed in FIGS. 1 and 2.

While the invention has been shown and described with respect to a specific embodiment thereof this is intended for the purpose of illustration rather than limitation and other variations and modifications will be apparent to one skilled in the art upon a reading of the specification. Therefore, the patent is not to be limited in scope and effect to the specific embodiment herein shown and described nor in any other way that is inconsistant with the extent to which the progress in the art has been advanced by the invention.

We claim:

1. Apparatus for measuring the diameter and axial width of a tire while it is being transported, comprising
   first fixed reference means continuously engageable with one side of said moving tire in the plane defined by the tire side wall on one side,
   second fixed reference means continuously engageable with the tread of said tire along a tangent line parallel to the tire's direction of travel,
   a width sensor mounted on an arm pivoted about a horizontal axis, said sensor movable in a fixed arcuate path toward and away from said plane and adapted to engage the other side of said tire and to be displaced away from said plane by said tire, as it travels past said fixed path, a spacing equal at its greatest magnitude, to the axial width of said tire,
   a diameter sensor mounted on an arm pivoted about a vertical axis, said sensor movable in a fixed arcuate path toward and away from said line and adapted to engage the tread of said tire and be displaced away from said line by said tire, as it travels past said fixed path, a spacing equal at its greatest magnitude to the diameter of said tire,
   means resiliently urging said width sensor toward said plane,
   means resiliently urging said diameter sensor toward said line,
   means responsive to the displacement of said width sensor for generating a first signal, the maximum level of which represents the axial width of said tire, and
   means responsive to the displacement of said diameter sensor, for generating a second signal, the maximum level of which represents the diameter of said tire.

2. Apparatus as defined in claim 1 wherein said first fixed reference means comprises a bed of driven conveyor rolls.

3. Apparatus as defined in claim 1 wherein said second fixed reference means comprises an elongated member having an upright, generally flat surface adapted to engage the tread of said tire during travel of said tire past said diameter sensor.

4. Apparatus as defined in claim 1 wherein said sensors comprise rollers adapted for free rotation while in engagement with the respective portions of a tire.

5. Apparatus as defined in claim 1 wherein said means urging said width sensor toward said plane comprises the weight of said width sensor and said pivot arm on which said width sensor is carried.

6. Apparatus as defined in claim 1 wherein said means urging said diameter sensor toward said plane comprises a helical tension spring.

7. Apparatus as defined in claim 1 wherein each of said signal generating means comprises a linear variable distance transformer.

8. Apparatus as defined in claim 1 in combination with an analog to digital converter for converting said signal into pulses suitable for input to a digital computer.

9. Apparatus as defined in claim 8 in combination with a digital computer for comparing the axial width and diameter of said tire, measured from said signals, with the axial width and diameter of tires of a plurality of geometrical classes of tires to compute the geometrical class of said measured tire.

10. A method for determining the geometrical class of a tire, comprising the steps of:
transporting the tire past a measuring station with one side wall continuously located on a fixed reference plane, and with its tread continuously tangent to a fixed reference line,
displacing a width sensor movable in a fixed arcuate path, away from said plane by engagement with the other side wall of said tire as said tire travels past said measuring station, the spacing from said reference plane to said displaced width sensor being equal at its greatest magnitude to the axial width of said tire,
displacing a diameter sensor movable in a fixed arcuate path, away from said line by engagement with the tread of said tire as said tire travels past said measuring station, the spacing from said reference line to said displaced diameter sensor being equal, at its greatest magnitude, to the diameter of said tire,
generating electrical voltage signals proportional to the respective displacements of said sensor, the maximum levels of said signals being representative of the axial width and diameter respectively, of said tire, and measurng the levels of said signals.

11. A method as defined in claim 10 including the additional steps of converting said voltage signals into electrical pulses for input to a digital computer.

12. A method as defined in claim 10 including the additional step of comparing the axial width and diameter of said tire measured from said signals, with the axial widths and diameters of tires of a plurality of geometrical classes of tires to determine geometrical class of said measured tire.

* * * * *